No. 707,029. Patented Aug. 12, 1902.
M. A. SMITH.
FILTER AND HYDRAULIC PRESS MEMBER.
(Application filed May 25, 1901.)
(No Model.) 4 Sheets—Sheet 1.
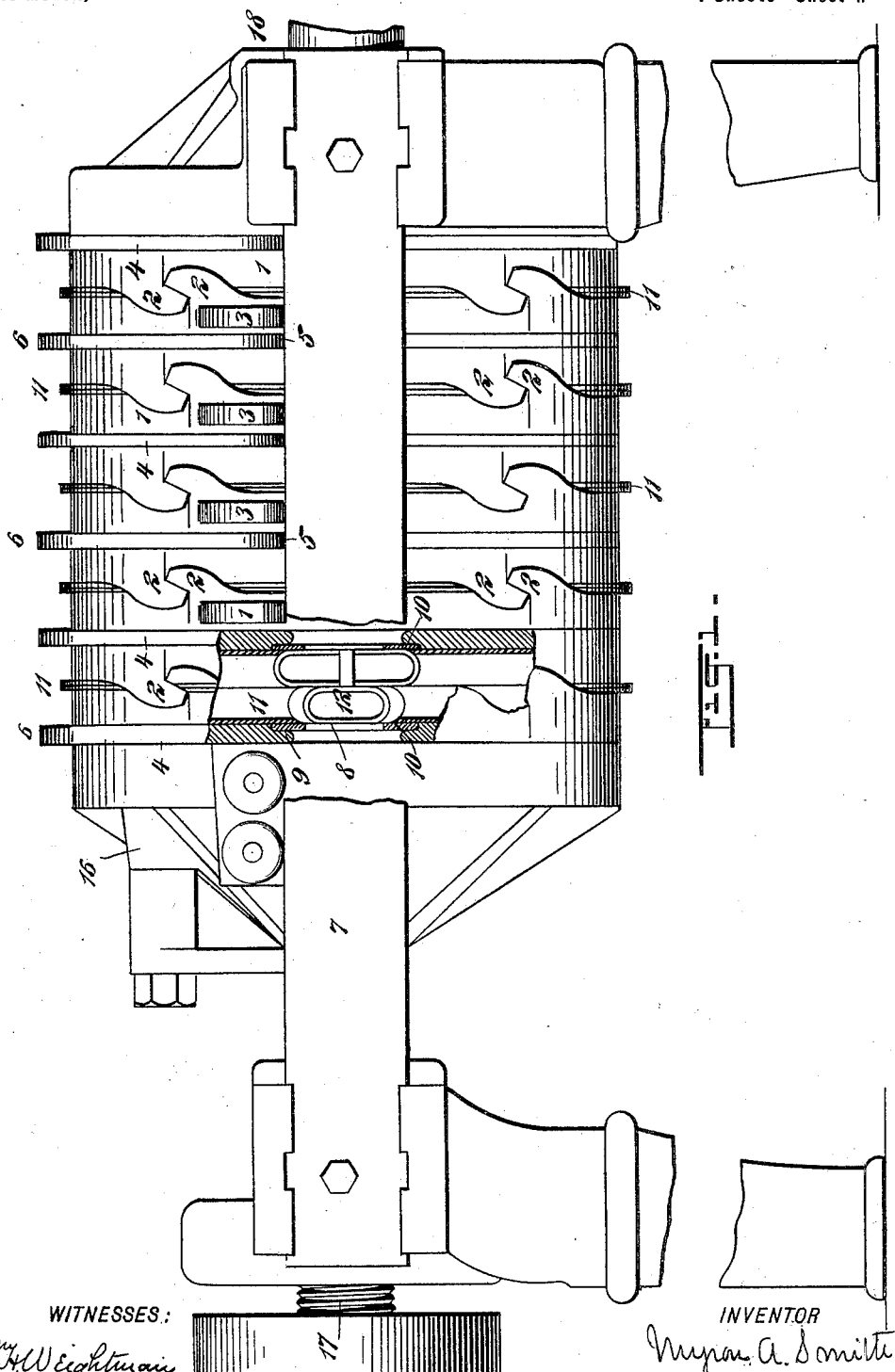
WITNESSES:
W. H. Weightman
A. E. Andrews.
INVENTOR
Myron A. Smith,
BY A. M. Pierce,
ATTORNEY.

No. 707,029. Patented Aug. 12, 1902.
M. A. SMITH.
FILTER AND HYDRAULIC PRESS MEMBER.
(Application filed May 25, 1901.)
(No Model.) 4 Sheets—Sheet 2.
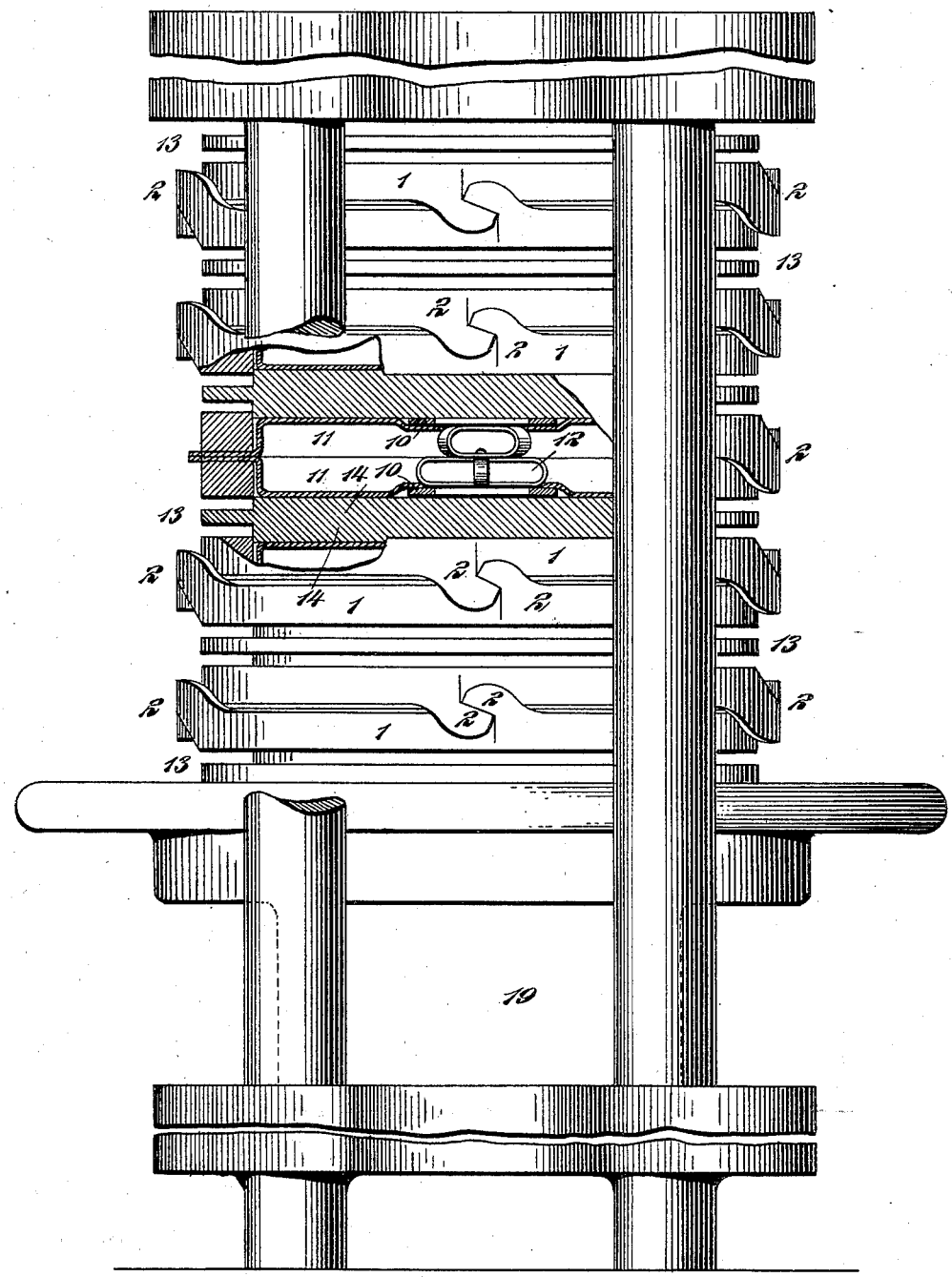
WITNESSES:
W. H. Weightman
A. E. Andrews.
INVENTOR
Myron A. Smith,
BY A. M. Pierce,
ATTORNEY.

No. 707,029. Patented Aug. 12, 1902.
M. A. SMITH.
FILTER AND HYDRAULIC PRESS MEMBER.
(Application filed May 25, 1901.)
(No Model.) 4 Sheets—Sheet 3.
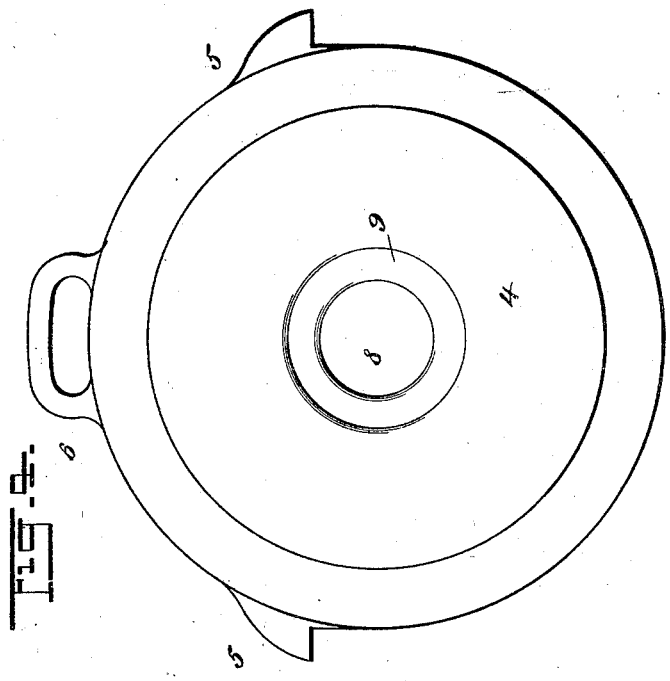
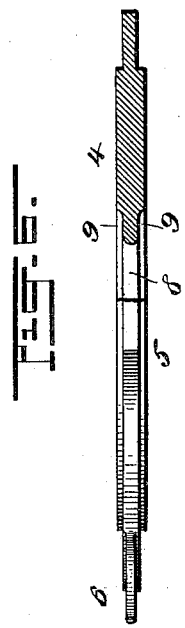
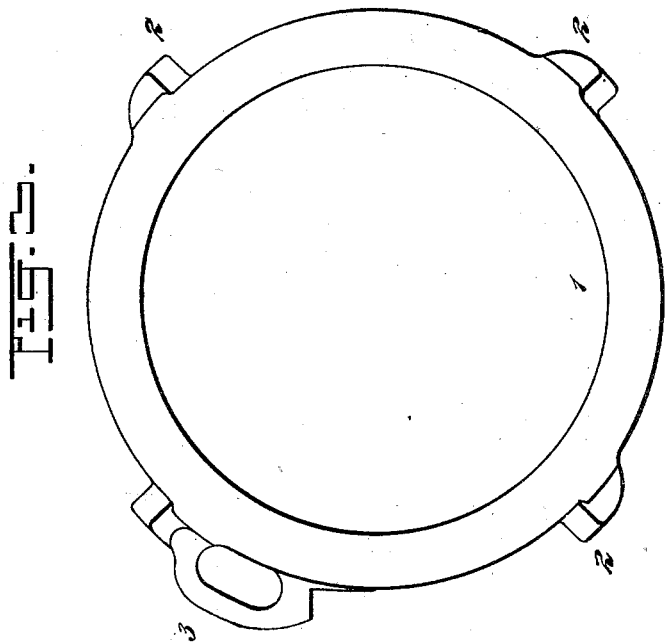
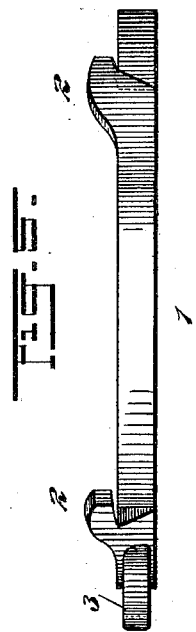
WITNESSES:
INVENTOR
ATTORNEY.

No. 707,029. Patented Aug. 12, 1902.
M. A. SMITH.
FILTER AND HYDRAULIC PRESS MEMBER.
(Application filed May 25, 1901.)
(No Model.) 4 Sheets—Sheet 4.

WITNESSES:
Wm H. Weightman
A. E. Andrews.

INVENTOR
Myron A. Smith,
BY A. M. Pierce,
ATTORNEY.

United States Patent Office.

MYRON A. SMITH, OF NEW YORK, N. Y., ASSIGNOR TO INTERNATIONAL MACHINE CO., OF NEW YORK, N. Y.

FILTER AND HYDRAULIC PRESS MEMBER.

SPECIFICATION forming part of Letters Patent No. 707,029, dated August 12, 1902.

Application filed May 25, 1901. Serial No. 61,851. (No model.)

*To all whom it may concern:*

Be it known that I, MYRON A. SMITH, a citizen of the United States, residing in the city, county, and State of New York, have invented a new and useful Improvement in Filter and Hydraulic Press Members, of which the following is a specification.

My invention relates especially to means and mechanism for treating cocoa liquor in extracting the butter from the solid portions thereof and for kindred uses, and has for its object the provision of simple and powerful mechanism whereby a greater percentage of cocoa-butter may be extracted than has heretofore been possible.

To attain the desired end, my invention consists, essentially, in a plurality of metallic rings or frames adapted and arranged to interchangeably form a part of a filter-press and of a hydraulic press; and my invention also involves certain novel and useful combinations or arrangements of parts and peculiarities of construction and operation, all of which will be hereinafter first fully described and then pointed out in the claims.

Figure 7:
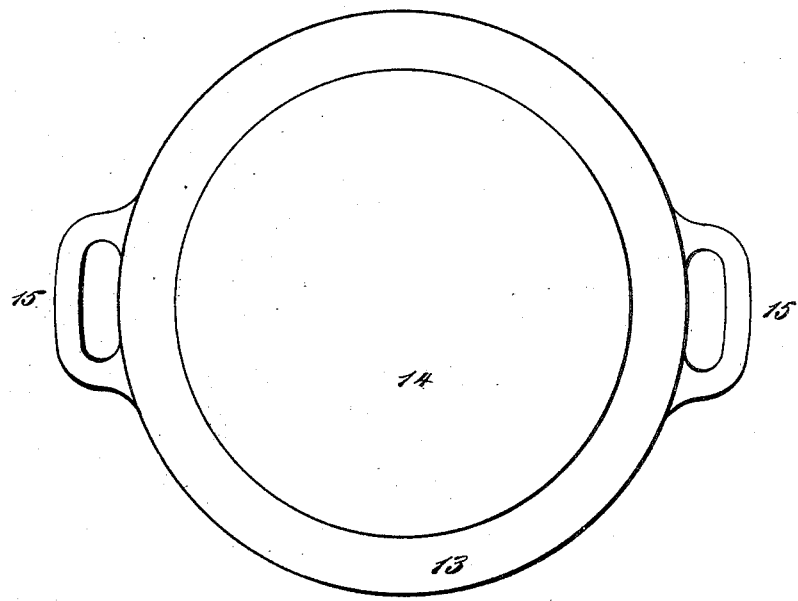
Figure 8:
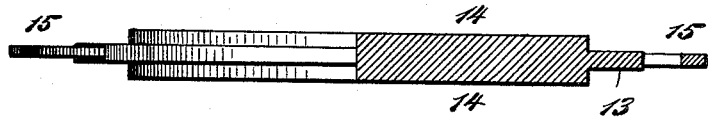
Figure 9:
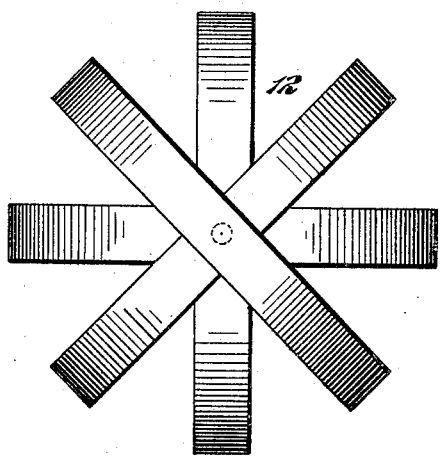

In the accompanying drawings, forming a part hereof, Figure 1 is a side elevation of a filter-press of which my invention forms a part. Fig. 2 is a like view of a hydraulic press containing the same. Fig. 3 is a plan view of one of the interchangeable interlocking rings, and Fig. 5 is a side elevation thereof. Fig. 4 is a plan view of a dividing or separating plate used in the filter-press, and Fig. 6 is a side elevation and partial axial section of the same. Fig. 7 is a plan view of one of the dividing-plates used in the hydraulic press, and Fig. 8 is a side elevation and partial axial section of the same. Fig. 9 is a plan view of the spring mechanism shown as employed for holding the filter-cloths in place.

Similar numerals of reference wherever they occur indicate corresponding parts in all the figures.

1 is a metallic ring or frame provided with lugs 2, adapted and arranged to interlock with similar lugs upon another ring 1.

3 is a manipulating-handle, which also forms a support whereon the ring or frame rests when in place in a filter-press.

I have shown one method of locking each pair of rings 1 together; but it is obvious that any other method of holding them together might be employed without departing from the spirit of my invention.

4 represents dividing-plates used between the rings or frames 1 in the filter-press. These plates have supporting-ears 5 for resting upon the side bars 7 of the filter-press and a manipulating-handle 6.

8 is a perforation through the center of the plate, and 9 is an annular depression in each face of the plate for the reception of a ring 10, riveted to each filter-cloth 11.

12 is a spring placed between each pair of filter-cloths to hold them in place against the inner faces of the division-plates at the center thereof.

13 represents dividing-plates used between each pair of rings 1 when in place in the hydraulic press, such plates 13 having at each side a projecting face 14, forming a plunger for entering the rings 1.

15 represents manipulating-handles.

In practice my invention is employed as follows: A filter-cloth 11 is placed over each ring 1, each pair of rings being locked together by means of the lugs 2 and the cloths 11 snugly held against the inner faces of the dividing-plates by means of the springs 12. In placing in position in the filter-press, Fig. 1, a plate 4 is first put in position, then a pair of rings 1 with their inclosed filter-cloths, then another plate 4, and this is continued until the press is filled, the assembled parts being held in place by means of the usual head 16 and screw 17.

18 is a pipe for supplying the cocoa liquor to the filter-press by means of any suitable pump. The liquor is pumped into the press until the spaces between the filter-cloths are entirely filled and the pressure exerted by the pump has forced all the butter from the liquor which it is possible to force therefrom by such pressure. After draining the plates and rings or frames are released, the plates 4 taken away, and each pair of rings 1, with their inclosed mass of comparatively solid material still within the filter-cloths, is transferred to the hydraulic press 19. In assembling the rings 1 and their contents in this press a plate 13 is first put into the press, then a pair of rings 1, then another plate 13, and this is continued until the press is filled, when pressure is applied, forcing the faces 14 of the plates 13 into the rings 1.

By my peculiar construction and arrangement much labor is saved in manipulation and a greater percentage of butter is extracted than in ordinary constructions. Usually when the filter-press is taken apart the mass is broken out of the frames and then transferred to the cylinder of a hydraulic press and pressure applied to each end of the cylinder. In my invention the mass of material is not removed from the rings or frames when taken from the filter-press, but remains in said rings or frames, which themselves form sections of the hydraulic-press cylinder, and when in position in the latter press and the pressure is applied instead of a large mass of material between two heads the comparatively thin mass between the dividing-plates 13, separating each pair of rings, receives the whole pressure, greatly increasing the efficiency of action and consequent amount of butter expressed.

Having now fully described my invention, what I claim as new therein, and desire to secure by Letters Patent, is—

1. A plurality of metallic rings or frames adapted and arranged to interchangeably form a part of a filter-press and of a hydraulic press, in combination with filter-cloths held between each pair of rings or frames, and means for holding said cloths apart at their centers, substantially as shown and described.

2. A plurality of metallic rings or frames adapted and arranged to interchangeably form a part of a filter-press and of a hydraulic press, in combination with separating-plates interposed between each pair of pairs of rings or frames.

3. The combination with a pair of interlocking rings or frames and interposed dividing-plates, of filter-cloths located between the rings or frames, and means for holding said cloths against the inner faces of the dividing-plates.

Signed by me at New York this 8th day of May, 1901.

MYRON A. SMITH.

Witnesses:
A. M. PIERCE,
C. A. PIERCE.